3,265,711
AMINOTETRAHYDROFURYL ESTERS
Richard P. Pioch, Indianapolis, Ind., assignor to Eli Lilly and Company, Indianapolis, Ind., a corporation of Indiana
No Drawing. Filed May 24, 1965, Ser. No. 458,462
6 Claims. (Cl. 260—332.2)

This invention relates to derivatives of tetrahydrofuran. More particularly, this invention relates to esters of 3-hydroxy-4-substituted-aminotetrahydrofuran.

The compounds of the present invention constitute a novel class of compounds of the following formula:

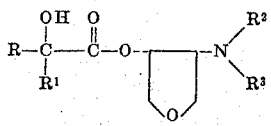

wherein, when taken separately, R is phenyl and $R^1$ may be hydrogen, phenyl, tolyl, chlorophenyl, trifluoromethylphenyl, benzyl, thienyl, $C_1$–$C_4$ alkyl, $C_3$–$C_7$ cycloalkyl; bicycloheptyl, or bicycloheptenyl; and R and $R^1$, when taken together with the carbon atom to which they are attached, are 9-fluoroethyl; $R^2$, when taken separately, may be hydrogen or lower alkyl containing from 1 to 3 carbon atoms; $R^3$, when taken separately, may be lower alkyl of 1 to 4 carbon atoms, cyclopropyl, cyclobutyl, or allyl; and $R^2$ and $R^3$, when taken together with the nitrogen atom to which they are attached, form a 5- to 7-membered saturated heterocyclic ring. Also a part of the invention are the acid addition salts of the above compounds prepared with pharmaceutically acceptable acids.

The lower alkyl groups in the above shown compound can be either straight or branched chain, as for example, methyl, ethyl, propyl, isopropyl, butyl, isobutyl, secondary butyl, and the like. The substituents on the phenyl ring can be in any of the ortho-, meta- or para-positions to the point of attachment of the ring. Thus, for example, included in the above compounds are those in which $R^1$ is o-tolyl, m-tolyl, p-tolyl, o-chlorophenyl, m-chlorophenyl, p-chlorophenyl, o-trifluoromethylphenyl, m-trifluoromethylphenyl, or p-trifluoromethylphenyl. The permissible cycloalkyl groups include cyclopropyl, cyclobutyl, cyclopentyl, cyclohexyl, cycloheptyl, methylcyclohexyl, and the like. The amino function can be either secondary or tertiary. Permissible amino substituents on the tetrahydrofuryl ring, therefore, include methylamino, ethylamino, isopropylamino, propylamino, allylamino, cyclopropylamino, dimethylamino, diethylamino, dipropylamino, ethylmethylamino, methylpropylamino, allylmethylamino, cyclopropylmethylamino, cyclobutylmethylamino, pyrrolidino, piperidino, methylpiperidino, hexamethyleneimino, morpholino, thiamorpholino, 4-methylpiperazino, and the like.

From the above structural formula, it is apparent that the compounds of this invention can be regarded as amino-substituted 3-tetrahydrofuryl esters of α,α-disubstituted hydroxyacetic acids. The esters can be prepared by a variety of procedures which are common in the art.

When the desired compound is a 4-dialkylaminotetrahydrofuryl-3 ester of an α,α-disubstituted hydroxyacetic acid, the well-known base catalyzed ester interchange reaction can be employed with a lower alkyl ester of the α,α-disubstituted hydroxyacetic acid and the appropriate 3-hydroxy-4-dialkylaminotetrahydrofuran. Thus, for example, 4-dimethylaminotetrahydrofuryl-3 benzilate is conveniently prepared by heating, in the presence of a catalytic amount of a base, a toluene solution of methyl benzilate and 3-hydroxy-4-dimethylaminotetrahydrofuran.

An alternative preparation of the dialkylamino-substituted derivative employs the reaction of a 3-halo-4-dialkylaminotetrahydrofuran with the sodium or potassium salt of an α,α-disubstituted hydroxyacetic acid. Such a preparation is illustrated by the reaction of 3-chloro-4-dimethylaminotetrahydrofuran with α-phenyl-α-cyclopentylhydroxyacetic acid in the presence of a molar equivalent of a base such as sodium hydroxide, potassium hydroxide, sodium methoxide and the like. If the amino reactant is employed in the form of its acid addition salt, an additional equivalent of base must, of course, be employed in the reaction to neutralize the acid so introduced.

Still another method for the preparation of the compounds of this invention employs an α,α-disubstituted-α-haloacetyl halide as a starting material. The said α-haloacetyl halide is caused to react with a suitably substituted 3-hydroxy-4-dilkylamino-tetrahydrofuran to give a 4-dialkylamino-tetrahydrofuryl-3 α,α-disubstituted-α-haloacetate. This intermediate can then be hydrolyzed by known procedures to give the corresponding α-hydroxy derivative. Thus, for example, α-phenyl-α-cyclohexyl-α-chloroacetyl chloride, when heated in benzene in the presence of pyridine with 3-hydroxy-4-dimethylaminotetrahydrofuran, provides 4-dimethylaminotetrahydrofuryl-3 α-phenyl-α-cyclohexyl-α-chloroacetate, which, upon hydrolysis, gives the desired 4-dimethylaminotetrahydrofuryl-3 α-phenyl-α-cyclohexyl-α-hydroxyacetate hydrochloride.

In general, the monoalkylamino substituted derivatives are prepared via the corresponding dialkylamino compounds by known processes whereby one of the substituents on the amino group is removed. Thus, for example, a monoalkylamino compound can be prepared from the corresponding benzylalkylamino derivative by catalytic hydrogenolysis of the benzyl substituent. Similarly, a monomethylamino derivative can be prepared from its corresponding dimethylamino analogue by removal of one of the methyl groups via the well-known ethyl azodicarboxylate method.

The α,α-disubstituted hydroxyacetic esters or acids employed as intermediates in the synthesis are usually prepared by one of two generally applicable methods. Thus, for example, methyl α-cycloheptyl-α-phenylhydroxyacetate is readily prepared by the reaction of methyl phenylglyoxylate and cycloheptyl magnesium chloride. This method is generally applicable where the Grignard reagent corresponding to the α-substituent is readily available. When the desired Grignard reagent, or rather the corresponding halogen derivative from which it is prepared, is not readily available an alternative procedure can be employed. Thus, methyl α-phenyl-α-[2-bicyclo(2.2.1)heptyl]hydroxy acetate can be prepared from methyl α-phenyl-α-[2-bicyclo(2.2.1)heptane]-2-carboxaldehyde as the starting material. The aldehyde is first treated with sodium bisulfite to give the corresponding bisulfite addition product, which is then treated with potassium cyanide to produce α-[2-bicyclo(2.2.1)heptyl]-α-hydroxyacetonitrile. The α-hydroxyacetonitrile derivative is then treated with absolute methanol in the presence of hydrogen chloride to give the corresponding imino ether hydrochloride which can readily be hydrolyzed to methyl α-[2-bicyclo(2.2.1)heptyl]hydroxy acetate. Conventional oxidation of this α-hydroxy ester, as for example with chromic oxide in acetic acid, produces methyl 2-bicyclo(2.2.1)heptylglyoxylate. The α-keto ester so obtained reacts readily with Grignard reagents, such as for example, phenyl magnesium bromide to give the desired methyl α-phenyl-α-[2-bicyclo(2.2.1)heptyl]hydroxy acetate. Similar procedures can be followed in other instances where a suitable aldehyde is more readily available than the required Grignard reagent or halogen substituted compound.

The preparation of the required 3-hydroxy-4-substituted-aminotetrahydrofurans is readily accomplished via the reaction of 3,4-epoxytetrahydrofuran with the desired amine. The reaction can be carried out in the absence of a solvent or, conveniently, an inert solvent such as toluene, xylene, and the like, can be employed. Generally, the reaction is carried out at elevated temperatures for periods ranging upwards from about 16 hours, although unnecessarily prolonged heating at elevated temperatures is desirably avoided. Alternatively, the reaction can be carried out at relatively low temperatures by permitting a mixture of the reactants to stand for extended periods of time. Thus, for example, the preparation of 3-hydroxy-4-methylaminotetrahydrofuran is accomplished in excellent yield by permitting 3,4-epoxytetrahydrofuran and an excess of 40 percent aqueous methylamine to stand in a pressure bottle for about 10 to 11 days at a temperature of about 35° C. Usually, however, in order to make the reaction go to completion more quickly, the reactants are heated at temperatures ranging between about 100 and 140° C. for about 16–24 hours.

The compounds of the present invention possess valuable pharmacological properties. Specifically, the compounds are centrally active anticholinergic compounds with excellent central nervous system stimulant activity.

Although the present description has been primarily concerned with esters having an α-hydroxy substituent, the corresponding α-chloro analogues are frequently equivalent to the hydroxy compounds. Thus, for example, 4-dimethylaminotetrahydrofuryl-3 α-chloro-α,α - diphenyl acetate is equal to its hydroxy analogues in its antidepressant properties.

The invention is further illustrated by the preparations and specific operating examples which follow. It will be understood by those skilled in the art that these are illustrative in nature and that many modifications can be made therein without departing from the spirit of the invention.

PREPARATION OF 3-HYDROXY-4-SUBSTITUTED-AMINOTETRAHYDROFURANS

*Procedure A.*—A mixture of 50 g. of 3,4-epoxytetrahydrofuran and 800 g. of 40 percent aqueous methylamine is kept in a pressure bottle for 10 days at a temperature of about 35° C. At the end of this time, water and the excess methylamine are removed in vacuo and the residual liquid is distilled. The desired 3-hydroxy-4-methylaminotetrahydrofuran boils at about 89° C. at about 0.35 mm.; $n_D^{26}=1.4822$. The yield is about 93 percent. Analysis—Calc.: C, 51.26; H, 9.46; N, 11.46. Found: C, 51.54; H, 9.67; N, 12.02.

*Procedure B.*—A mixture of 50 g. of 3,4-epoxytetrahydrofuran and 100 g. of 25 percent aqueous dimethylamine is heated in an autoclave at about 120° C. for about 20 hours. The product, isolated as in procedure A, distills at about 87–88° C. at about 0.7 mm.; $n_D^{25}=1.4704$ to 1.4710. The yield is quantitative. Analysis—Calc.: N, 10.68. Found: N, 10.87.

The compounds listed below were prepared by employing the above procedure with suitable amines. In some instances, an inert organic solvent, such as xylene, was employed.

3-hydroxy-4 - ethylmethylaminotetrahydrofuran, B.P. about 187–188° C. at about 0.4–0.5 mm.; $n_D^{25}=1.4752$. Analysis—Calc.: C, 57.90; H, 10.41; N, 9.65. Found: C, 58.11; H, 10.68; N, 9.47.

3-hydroxy-4-diethylaminotetrahydrofuran, B.P. about 82° C. at about 0.5 mm.; $n_D^{26}=1.4724$. Analysis—Calc.: C, 60.34; H, 10.76; N, 8.80. Found: C, 60.15; H, 10.92; N, 8.98.

3-hydroxy-4-allylethylaminotetrahydrofuran, B.P. about 56° C. at about 0.25 mm.; $n_D^{26}=1.4840$.

3-hydroxy-4 - cyclopropylmethylaminotetrahydrofuran, B.P. about 102° C. at about 0.35 mm.; $n_D^{26}=1.4843$. Analysis—Calc.: C, 61.12; H, 9.62; N, 8.91. Found: C, 61.11; H, 9.74; N, 9.11.

3-hydroxy - 4 - methylisopropylaminotetrahydrofuran, B.P. about 108° C. at about 0.7 mm.; $n_D^{25}=1.4736$. Analysis—Calc.: C, 60.34; H, 10.76; N, 8.80. Found: C, 60.10; H, 10.42; N, 8.30.

3-hydroxy-4 - pyrrolidinotetrahydrofuran, B.P. about 118–120° C. at about 1 mm. Analysis—Calc.: C, 61.92; H, 9.62; N, 8.91. Found: C, 61.22; H, 9.53; N, 8.70.

3-hydroxy-4-piperidinotetrahydrofuran, B.P. about 114° C. at about 0.6 mm. Analysis—Calc.: C, 63.12; H, 10.00; N, 8.18. Found: C, 63.75; H, 10.44; N, 7.84.

3-hydroxy-4 - morpholinotetrahydrofuran, B.P. about 143–147° C. at about 0.6 mm. Analysis—Calc.: C, 55.47; H, 8.72; N, 8.09. Found: C, 55.20; H, 8.89; N, 8.19.

3-hydroxy-4 - (4 - methylpiperidino)tetrahydrofuran, B.P. about 118–120° C. at about 0.5 mm.;

$$n_D^{25}=1.4520$$

3-hydroxy - 4 - (4 - methylpiperazino)tetrahydrofuran, B.P. about 140–142° C. at about 0.7 mm. Analysis—Calc.: C, 58.03; H, 9.74; N, 15.04. Found: C, 57.95; H, 9.91; N, 15.31.

3 - hydroxy - 4 - hexamethyleneiminotetrahydrofuran, B.P. about 117–118° C. at about 0.4 mm.; $n_D^{25}=1.5032$. Analysis—Calc.: C, 64.83; H, 10.34; N, 7.56. Found: C, 65.07; H, 10.62; N, 7.55.

PREPARATION OF 3-CHLORO-4-DIALKYL-AMINOTETRAHYDROFURANS

The following preparation illustrates the general procedure employed in the preparation of the 3-chloro-4-dialkylaminotetrahydrofurans employed as intermediates.

Anhydrous hydrogen chloride gas was passed through a solution of 6.5 g. of 3-hydroxy-4-dimethylaminotetrahydrofuran in chloroform until the hydrochloride salt separated from solution. The mixture was then cooled and 7 g. of thionyl chloride were added. The reaction mixture was heated under reflux for about two hours and the solvent removed in vacuo to yield a residue comprising 3-chloro-4-dimethylaminotetrahydrofuran hydrochloride which, after recrystallization from a solvent mixture comprising methanol and ethyl acetate, melted at about 150–158° C.

Example 1

A solution of 15.1 g. (0.1 mole) of 3-hydroxy-4-dimethylaminotetrahydrofuran and 26.6 g. (0.11 mole) of methyl benzilate in 250 ml. of benzene was treated with 50 mg. of sodium methoxide. The reaction mixture was heated under reflux for about 24 hours in an apparatus which permitted automatic separation by azeotropic distillation of trace amounts of water and of methanol formed in the ester interchange. An additional 25 mg. of sodium methoxide were added during the reflux period. The reaction mixture was cooled and filtered to remove traces of an unidentified solid, and the filtrate was washed thoroughly with water until it was apparent that no further extraction was being effected. The benzene layer was then extracted four times with 50-ml. portions of hydrochloric acid containing 0.05 mole of 12 N hydrochloric acid per 100 ml. The combined acidic extracts were made basic with concentrated ammonium hydroxide solution, and the semi-solid material which was liberated by this treatment was extracted with ether. The combined ether extracts were dried and concentrated to give about 20 g. of crystalline 4-dimethylaminotetrahydrofuryl-3 benzilate as the free base. The hydrochloride salt was prepared and, after recrystallization from a solvent mixture of methanol and ethyl acetate, melted at about 186° C. with decomposition. Analysis—Calc.: C, 63.57; H, 6.40; N, 3.71. Found: C, 63.30; H, 6.67; N, 3.66.

By employing the above procedure with the appropriate amino derivative, the following compounds were also prepared:

4 - pyrrolidinotetrahydrofuryl - 3 benzilate hydrochloride, M.P. about 204–205° C. from 3-hydroxy-4-pyrrolidinotetrahydrofuran. Analysis—Calc.: C, 65.42; H, 6.48; N, 3.47. Found: C, 65.18; H, 6.75; N, 3.38.

4 - piperidinotetrahydrofuryl - 3 benzilate hydrochloride, M.P. about 216–217° C. from 3-hydroxy-4-piperidinotetrahydrofuran. Analysis—Calc.: C, 66.10; H, 6.75; N, 3.35. Found: C, 65.86; H, 6.84; N, 3.14.

Example 2

A toluene solution containing 2.9 g. (0.02 mole) of 3 - hydroxy - 4 - ethylmethylaminotetrahydrofuran was heated under reflux in an apparatus equipped with a water trap for removal of trace amounts of water by azeotropic distillation. After about one hour, 30 mg. of metallic sodium were added. When all the sodium had dissolved, 5.3 g. of methyl benzilate were added and the reaction mixture was heated under reflux for an additional six hours. The mixture was cooled and 100 ml. of benzene were added, after which the diluted reaction mixture was washed with four 100-ml. portions of water. The organic layer was extracted with dilute hydrochloric acid prepared by dissolving 8 ml. of concentrated hydrochloric acid in 100 ml. of water. The acidic extract was made basic by the addition of concentrated ammonium hydroxide, and the product was extracted with ether. Concentration of the ether yielded 5.5 g. of 4-ethylmethylaminotetrahydrofuryl-3 benzilate. The hydrochloride salt was prepared and, after recrystallization from a solvent mixture of methanol and ethyl acetate, melted at about 164–165° C. Analysis—Calc.: C, 64.36; H, 6.68; N, 3.57. Found: C, 64.21; H, 6.73; N, 3.46.

By employing the above procedure, with minor modifications, with the appropriate 3-hydroxy-4-dialkylaminotetrahydrofuran the following compounds were also prepared:

4 - diethylaminotetrahydrofuryl-3 benzilate hydrochloride, M.P. about 113–114° C.

4 - allylmethylaminotetrahydrofuryl-3 benzilate hydrochloride, M.P. about 151–152° C. Analysis—Calc.: C, 65.42; H, 6.48; N, 3.47. Found: C, 65.24; H, 6.66; N, 3.58.

4 - cyclopropylmethylaminotetrahydrofuryl-3 benzilate hydrochloride, M.P. about 183–184° C. Analysis—Calc.: C, 65.42; H, 6.48; N, 3.47. Found: C, 65.77; H, 6.69; N, 3.45.

4 - isopropylmethylaminotetrahydrofuryl - 3 benzilate hydrochloride, M.P. about 157–158° C. Analysis—Calc.: C, 65.09; H, 6.95; N, 3.45. Found: C, 64.82; H, 7.01; N, 3.41.

4-morpholinotetrahydrofuryl-3 benzilate hydrochloride, M.P. about 178–179° C. with decomposition. Analysis—Calc.: C, 62.92; H, 6.24; N, 3.34. Found: C, 62.73; H, 6.16; N, 3.48.

4-(4-methylpiperidino)tetrahydrofuryl-3 benzilate hydrochloride, M.P. about 176–177° C. Analysis—Calc.: C, 67.57; H, 7.21; N, 3.24. Found: C, 66.34; H, 7.11; N, 3.46.

4-(4-methylpiperazino)tetrahydrofuryl-3 benzilate dihydrochloride, M.P. about 199° C. with decomposition. Analysis—Calc.: N, 5.97. Found: N, 5.82.

4-hexamethyleneiminotetrahydrofuryl-3 benzilate hydrochloride, M.P. about 177–178° C. Analysis—Calc.: C, 66.73; H, 7.00; N, 3.24. Found: C, 66.62; H, 7.08; N, 3.46.

4-benzylmethylaminotetrahydrofuryl-3 benzilate hydrochloride, M.P. about 165–167° C. Analysis—Calc.: C, 68.79; H, 6.21; N, 3.09. Found: C, 68.78; H, 6.48; N, 3.34.

Example 3

A solution of 2.8 g. of 3-hydroxy-4-dimethylaminotetrahydrofuran in toluene was heated under reflux in an apparatus equipped with a water trap for removing water by azeotropic distillation. About 25 mg. of metallic sodium were then added to the anhydrous solution, and heating was continued until the sodium was consumed. The refluxing solution was cooled while 5.9 g. of methyl α-phenyl-α-(2-thienyl)glycolate were added. Refluxing was continued for about two hours with removal of the methanol formed in the reaction by azeotropic distillation into the trap. The reaction mixture was cooled, washed with six 25-ml. portions of water and extracted with dilute hydrochloric acid. The acid extracts were made basic by the addition of concentrated ammonium hydroxide, and the oil which separated was extracted with ether. The combined ether extracts were dried and evaporated to give about 3 g. of 4-dimethylaminotetrahydrofuryl-3 α - (2 - thienyl)glycolate. The amine was converted to the hydrochloride salt which, upon recrystallization from a mixture of methanol and ethyl acetate, melted at about 197–199° C. Analysis—Calc.: C, 56.31; H, 5.77; N. 3.65. Found: C, 56.51; H, 5.89; N, 3.48.

Example 4

By employing the procedure of Example 3 using 5.3 g. of methyl α-phenyl-α-(o-tolyl)glycolate as the ester, 4-dimethylaminotetrahydrofuryl - 3 α - phenyl - α - (o-tolyl)glycolate is obtained. The hydrochloride, upon recrystallization from a mixture of methanol and ethyl acetate, is obtained in two forms. The α-isomer melts at about 170–178° C. while the β-isomer melts at about 130–140° C. Analysis—Calc.: C, 64.36; H, 6.68; N, 3.57. Found: For the α-isomer—C, 64.16; H, 6.67; N, 3.51. For the β-isomer—C, 64.59; H, 6.73; N, 3.55.

By employing the above procedure with methyl α-phenyl-α-(m-tolyl)glycolate, 4 - dimethylaminotetrahydrofuryl-3 α-phenyl-α-(m-tolyl)glycolate is obtained. The hydrochloride salt, after recrystallization from a methanol-ethyl acetate solvent mixture, melts at about 175–176° C. Analysis—Calc.: C, 64.36; H, 6.68; N, 3.57. Found: C, 64.10; H, 6.52; N, 3.53.

When methyl α-phenyl-α-(p-tolyl)glycolate is employed in the above procedure, 4 - dimethylaminotetrahydrofuryl-3 α-phenyl-α-(p-tolyl)glycolate is obtained. The hydrochloride melts about 182–185° C. Analysis—Calc.: C, 64.36; H, 6.68; N, 3.57. Found: C, 64.33; H, 6.76; N, 3.51.

Example 5

A solution of 5.4 g. of methyl α-phenyl-α-(p-chlorophenyl)glycolate in toluene was prepared, and trace amounts of water were removed from the solution by azeotropic distillation in an apparatus equipped with a water trap. About 30 mg. of metallic sodium were added and the mixture was heated under reflux until the sodium was consumed. The anhydrous mixture was treated with 2.32 g. of 3-hydroxy-4-dimethylaminotetrahydrofuran and the reaction mixture was heated under reflux for two hours, with azeotropic removal of the methanol formed in the reaction. The cooled reaction mixture was washed with four 50-ml. portions of water and the organic layer was then extracted with hydrochloric acid. The free base was liberated by the addition of concentrated ammonium hydroxide, and the product was extracted with ether. The dried ether extracts were evaporated to give about 6 g. of 4-dimethylaminotetrahydrofuryl - 3 α-phenyl-α-(p-chlorophenyl)glycolate. The hydrochloride melted at about 170–174° C. Analysis—Calc.: C, 58.26; H, 5.62; N, 3.40. Found: C, 58.53; H, 5.85; N, 3.18.

Example 6

A Grignard reagent was prepared in the usual manner from 33.1 g. of cycloheptyl chloride and 7.2 g. of magnesium in 150 ml. of anhydrous ether. When the reaction appeared to be complete, the Grignard solution was added dropwise to a solution containing 44.5 g. of methyl phenylglyoxylate in 225 ml. of anyhdrous ether. The reaction mixture was allowed to stand at room temperature overnight and was then cooled in an ice bath while a saturated aqueous ammonium chloride solution was added to decompose the reaction mixture. The solids were removed by filtration and the filtrate was washed thoroughly with water, the ether layer was dried over anhydrous magnesium sulfate and, after removal of the drying agent, the solvent was removed in vacuo. The residual oil was distilled through a Vigreux column to yield methyl α-phenyl-α-cycloheptylglycolate boiling at about 144–147° C. at about 0.3 mm. Analysis—Calc.: C, 73.88; H, 8.75. Found: C, 73.60; H, 8.65.

The methyl α-phenyl-α-cycloheptylglycolate so obtained was employed in the procedure of Example 3 to yield 4-dimethylaminotetrahydrofuryl - 3 α-phenyl - α - cycloheptylglycolate from which the hydrochloride salt was prepared. Analysis—Calc.: C, 63.38; H, 8.10; N, 3.52. Found: C, 63.77; H, 8.49; N, 3.65.

*Example 7*

A solution of 4.7 g. of α,β-diphenyllactic acid [J. Chem. Soc., 127, 376 (1925)] in 80 ml. of isopropanol was prepared. To the solution were added 2.1 g. of sodium methoxide and 3.6 g. of 3-chloro-4-dimethylaminotetrahydrofuran hydrochloride. The reaction mixture was heated under reflux overnight. The solvent was removed in vacuo, and the residue was stirred with a mixture of water and ether. The ether layer was washed thoroughly with water and was then extracted with 1:10 aqueous hydrochloric acid. The acidic extracts were made basic with concentrated ammonium hydroxide and the crude product was extracted with ether and converted to the hydrochloride salt. The 4-dimethylaminotetrahydrofuryl-3 α,β-diphenyllactate hydrochloride so obtained melted at about 114–116° C.

By employing the above procedure with the designated acids the following compounds were also prepared:

4 - dimethylaminotetrahydrofuryl - 3α-phenyl-α-cyclopentylglycolate hydrochloride, M.P. about 113–115° C., prepared from α-phenyl-α-cyclopentylglycolic acid. Analysis—Calc.: C, 61.69; H, 7.63; N, 3.79. Found: C, 61.54; H, 7.72; N, 3.61.

4 - dimethylaminotetrahydrofuryl - 3α-phenyl-α-cyclohexylglycolate hydrochloride, prepared from α-phenyl-α-cyclohexylglycolic acid [J.A.C.S., 71, 3772 (1949)]. Analysis—Calc.: C, 62.57; H, 7.87; N, 3.65. Found: C, 62.40; H, 8.18; N, 3.45.

4 - dimethylaminotetrahydrofuryl - 3α-phenyl-α-isopropylglycolate hydrochloride, M.P. about 197–198° C., prepared from α-phenyl-α-isopropylglycolic acid [Medizin Und Chemie, VII, 156 (1963)]. Analysis—Calc.: C, 59.38; H, 7.62; N, 4.07. Found: C, 59.37; H, 7.65; N, 4.08.

*Example 8*

An anhydrous solution comprising 6 g. of 3-hydroxy-4-cyclopropylmethylaminotetrahydrofuran in 50 ml. of benzene was prepared by distilling trace amounts of water from the solution as an azeotrope. To the anhydrous solution were added 3 g. of pyridine and 9.5 g. of α-phenyl-α-cyclopentyl-α-chloroacetylchloride (prepared from the acid with thionyl chloride followed by sulfuryl chloride). The reaction mixture was heated under reflux for about four hours and was then allowed to stand at room temperature for about 72 hours. The mixture was made basic by the addition of a saturated aqueous solution of sodium bicarbonate, and the organic layer was then washed with water until the washings were neutral. The product was extracted with dilute hydrochloric acid and the acidic extracts were made basic by the addition of 10 percent aqueous sodium bicarbonate. The crude product was extracted with ether, the ether evaporated, and the 4-cyclopropyl-mehtylaminotetrahydrofuryl - 3α - phenyl-α-cyclopentyl-α-chloroacetate so obtained converted to its hydrochloride. Hydrolysis of the chloro compound was effected by heating a 10 percent aqueous solution of the salt under reflux for about eigi.* ours. Evaporation in vacuo left a residue comprising 4-cyclopropylmethylaminotetrahydrofuryl - 3α - phenyl-α-cyclopentylglycolate hydrochloride. Analysis—Calc.: Cl, 8.95. Found: Cl, 8.59.

*Example 9*

To a solution of 1.15 g. of 4-dimethylaminotetrahydrofuryl-3 benzilate in 25 ml. of anhydrous benzene were added 0.574 g. of diethyl diazodicarboxylate. The mixture was heated under reflux for three hours and was then allowed to stand at room temperature for about 16 hours. The solvent was removed in vacuo and the residue was warmed on the steam bath for one hour with 5 ml. of 2 N hydrochloric acid. The reaction mixture was cooled and diluted with 10 ml. of water and was then washed with ether. The acidic aqueous layer was evaporated in vacuo, and the semi-solid residue was triturated, first with a solvent mixture of ethanol and benzene, and then with ethyl acetate to bring about crystallization of 4-methylaminotetrahydrofuryl-3 benzilate hydrochloride which, upon recrystallization from a mixture of methanol and ethyl acetate, melted at about 177–178° C. Analysis—Calc.: C, 62.72; H, 6.09; N, 3.85. Found: C, 62.67; H, 6.15; N, 4.03.

*Example 10*

A solution of 4 g. of 4-benzylethylaminotetrahydrofuryl-3 benzilate hydrochloride in 100 ml. of anhydrous ethanol was hydrogenated in the presence of a 5 percent palladium-on-carbon catalyst at a hydrogen pressure of 50 p.s.i. The hydrogenation mixture was filtered to remove the catalyst and the filtrate was evaporated to give 4-ethylaminotetrahydrofuryl-3 benzilate hydrochloride melting at about 183–184° C. after recrystallization from a mixture of methanol and ethyl acetate. Analysis—Calc.: C, 63.57; H, 6.40; N, 3.71. Found: C, 63.53; H, 6.44; N, 3.58.

I claim:

1. A compound of the formula

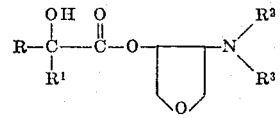

wherein, when taken separately, R is phenyl and $R^1$ is selected from the group consisting of hydrogen, phenyl, tolyl, chlorophenyl, trifluoromethylphenyl, benzyl, thienyl, $C_1$–$C_4$ alkyl, $C_3$–$C_7$ cycloalkyl, bicycloheptyl, and bicycloheptenyl;

R and $R^1$, when taken together with the carbon atom to which they are attached, are 9-fluorenyl;

$R^2$, when taken separately, is selected from the group consisting of hydrogen and $C_1$–$C_3$ alkyl;

$R^3$, when taken separately, is selected from the group consisting of $C_1$–$C_4$ alkyl, cyclopropyl, cyclobutyl and allyl; and $R^2$ and $R^3$, when taken together with the nitrogen atom to which they are attached, form a 5- to 7-membered heterocyclic ring selected from the group consisting of pyrrolidino, piperidino, methylpiperidino, hexamethyleneimino, morpholino, thiamorpholino, and 4-methylpiperazino.

2. 4-methylaminotetrahydrofuryl-3 benzilate.
3. 4-dimethylaminotetrahydrofuryl-3 benzilate.
4. 4-dimethylaminotetrahydrofuryl-3 α-phenyl-α-thienylglycolate.
5. 4-dimethylaminotetrahydrofuryl-3 α-phenyl-α-cyclopentylglycolate.
6. 4-dimethylaminotetrahydrofuryl-3 α-phenyl-α-cyclohexylglycolate.

No references cited.

HENRY R. JILES, *Primary Examiner.*

J. H. TURNIPSEED, *Assistant Examiner.*